United States Patent
Kim et al.

(10) Patent No.: US 11,245,132 B2
(45) Date of Patent: Feb. 8, 2022

(54) ELECTROLYTE FOR LITHIUM SECONDARY BATTERY, AND LITHIUM SECONDARY BATTERY COMPRISING SAME

(71) Applicant: SAMSUNG SDI CO., LTD., Yongin-si (KR)

(72) Inventors: Aeran Kim, Yongin-si (KR); Woo Cheol Shin, Yongin-si (KR); Jeongmin Shin, Yongin-si (KR); Hyunbong Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 277 days.

(21) Appl. No.: 16/604,241

(22) PCT Filed: Jan. 16, 2018

(86) PCT No.: PCT/KR2018/000721
§ 371 (c)(1),
(2) Date: Oct. 10, 2019

(87) PCT Pub. No.: WO2018/199429
PCT Pub. Date: Nov. 1, 2018

(65) Prior Publication Data
US 2020/0161703 A1    May 21, 2020

(30) Foreign Application Priority Data
Apr. 25, 2017  (KR) .................. 10-2017-0052979

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01M 10/0569* (2013.01);
(Continued)

(58) Field of Classification Search
CPC ......... H01M 10/0525; H01M 10/0567; H01M 10/0569; H01M 2004/027;
(Continued)

(56) References Cited

U.S. PATENT DOCUMENTS

2004/0146778 A1    7/2004  Lee et al.
2009/0130566 A1    5/2009  Iwanaga et al.
(Continued)

FOREIGN PATENT DOCUMENTS

CN    104282943 A    1/2015
JP    2002-056891 A    2/2002
(Continued)

OTHER PUBLICATIONS

International Search Report for PCT/KR2018/000721 filed on Jan. 16, 2018.
(Continued)

*Primary Examiner* — Carlos Barcena
(74) *Attorney, Agent, or Firm* — Lee IP Law, P.C.

(57) ABSTRACT

Provided are an electrolyte for a lithium secondary battery and a lithium secondary battery including the same wherein the electrolyte includes a non-aqueous organic solvent; a lithium salt; and an additive represented by Chemical Formula 1.

8 Claims, 5 Drawing Sheets

(51) Int. Cl.
*H01M 10/0569* (2010.01)
*H01M 4/02* (2006.01)

(52) U.S. Cl.
CPC .............. *H01M 2004/027* (2013.01); *H01M 2004/028* (2013.01); *H01M 2300/0054* (2013.01)

(58) Field of Classification Search
CPC ... H01M 2004/028; H01M 2300/0025; H01M 2300/0054
See application file for complete search history.

(56) References Cited

U.S. PATENT DOCUMENTS

| | | |
|---|---|---|
| 2009/0325065 A1 | 12/2009 | Fujii et al. |
| 2012/0009487 A1 | 1/2012 | Hwang et al. |
| 2012/0034532 A1 | 2/2012 | Kim et al. |
| 2015/0010810 A1 | 1/2015 | Cho et al. |

FOREIGN PATENT DOCUMENTS

| | | |
|---|---|---|
| JP | 2006-172721 A | 6/2006 |
| JP | 2006-318760 A | 11/2006 |
| JP | 2008-088104 A | 4/2008 |
| KR | 10-2001-0066160 A | 7/2001 |
| KR | 10-2004-0020640 A | 3/2004 |
| KR | 10-2008-0065561 A | 7/2008 |
| KR | 10-2009-0099313 A | 9/2009 |
| KR | 10-2010-0056672 A | 5/2010 |
| KR | 10-1023374 B1 | 3/2011 |

OTHER PUBLICATIONS

Fuscien, et al. Synthesis of aziridine-2-carboxylates via conjugate addition of an amine to 2-(5H)-furanon-3-yl methanesulfonate, etc., Tetrahedron Letters, Elsvier, Amterdam, NL, vol. 41, No. 7, Apr. 1, 2000, pp. 3061-3064, XP004196725.
Extended European Search Report dated Nov. 24, 2020
Chinese Office action dated Dec. 15, 2021.

ELECTROLYTE FOR LITHIUM SECONDARY BATTERY, AND LITHIUM SECONDARY BATTERY COMPRISING SAME

CROSS-REFERENCE TO THE RELATED APPLICATION

This is the U.S. national phase application based on PCT Application No. PCT/KR2018/000721, filed Jan. 16, 2018, which is based on Korean Patent Application No. 10-2017-0052979, filed Apr. 25, 2017, the entire contents of all of which are hereby incorporated by reference.

TECHNICAL FIELD

An electrolyte for a lithium secondary battery and a lithium secondary battery including the same are related.

BACKGROUND ART

Lithium secondary batteries are attracting attention as power sources for various electronic devices because of high discharge voltage and high energy density.

As for positive active materials of lithium secondary batteries, a lithium-transition metal oxide having a structure capable of intercalating lithium ions such as $LiCoO_2$, $LiMn_2O_4$, $LiNi_{1-x}Co_xO_2$ ($0<x<1$), and the like has been used.

As for negative active materials of lithium secondary batteries, various carbon-based materials such as artificial graphite, natural graphite, and hard carbon capable of intercalating and deintercalating lithium ions have been used.

As for electrolytes of lithium secondary batteries, an organic solvent in which a lithium salt is dissolved has been used.

The lithium secondary batteries have a high temperature problem, that is, gas generation and electrode resistance due to the reaction between the positive active material and the electrolyte, which are significantly increased at particularly high temperature, and in addition, the solid electrolyte interface (SEI) film formed on the negative active material surface is destroyed at high temperature, and by-products are continuously generated to accelerate an irreversible reaction of the battery, and this phenomenon causes problems with battery performance degradation and thickness expansion (swelling) due to gas at higher temperatures than room temperature.

DISCLOSURE

Technical Problem

An embodiment provides an electrolyte for a lithium secondary battery that may prevent problems of thickness expansion at high temperatures.

Another embodiment provides a lithium secondary battery including the electrolyte.

Technical Solution

According to an embodiment, an electrolyte for a lithium secondary battery includes a non-aqueous organic solvent; a lithium salt; and an additive represented by Chemical Formula 1 or Chemical Formula 2.

[Chemical Formula 1]

In Chemical Formula 1,
$R_a$ is a halogen, a substituted or unsubstituted alkyl group, or $C_nF_{2n+1}$ (n is an integer of 1 to 3),
$R_b$ is hydrogen, a halogen, a substituted or unsubstituted alkyl group, or $C_nF_{2n+1}$ (n is an integer of 1 to 3), and
X is S, O, or C.

[Chemical Formula 2]

In Chemical Formula 2,
$R_c$ is a halogen, a substituted or unsubstituted alkyl group, or $C_nF_{2n+1}$ (n is an integer of 1 to 3),
$R_d$ is a halogen, a substituted or unsubstituted alkyl group, or $C_nF_{2n+1}$ (n is an integer of 1 to 3), and
X is S, O, or C.

The additive may be the compound of Chemical Formula 1.

The $R_a$ and $R_c$ may each independently be a substituted or unsubstituted alkyl group and the $R_b$ and $R_d$ may be hydrogen. Herein, the alkyl group may have a carbon number of 1 to 3.

A content of the additive may be 0.1 wt % to 1 wt % or 0.25 wt % to 1 wt % based on a total weight of the electrolyte.

Another embodiment of the present invention provides a lithium secondary battery including a negative electrode including a negative active material; a positive electrode including a positive active material; and the electrolyte.

Other embodiments are included in the following detailed description.

Advantageous Effects

An electrolyte for a lithium secondary battery according to an embodiment of the present invention may improve storage characteristics at a high temperature, particularly high temperature swelling characteristics.

MODE FOR INVENTION

Hereinafter, embodiments of the present invention are described in detail. However, these embodiments are exemplary, the present invention is not limited thereto and the present invention is defined by the scope of claims.

An embodiment of the present invention provides an electrolyte for a lithium secondary battery including a non-aqueous organic solvent; a lithium salt; and an additive represented by Chemical Formula 1 or Chemical Formula 2.

[Chemical Formula 1]

In Chemical Formula 1,
$R_a$ is a halogen, a substituted or unsubstituted alkyl group, or $C_nF_{2n+1}$ (n is an integer of 1 to 3),
$R_b$ is hydrogen, a halogen, a substituted or unsubstituted alkyl group, or $C_nF_{2n+1}$ (n is an integer of 1 to 3), and
X is S, O, or C.

[Chemical Formula 2]

In Chemical Formula 2,
$R_c$ is a halogen, a substituted or unsubstituted alkyl group, or $C_nF_{2n+1}$ (n is an integer of 1 to 3),
$R_d$ is a halogen, a substituted or unsubstituted alkyl group, or $C_nF_{2n+1}$ (n is an integer of 1 to 3), and
X is S, O, or C.

In addition, in Chemical Formula 1 and Chemical Formula 2, the $R_a$ and $R_c$ may each independently be a substituted or unsubstituted alkyl group. Herein, the alkyl group may have a carbon number of 1 to 3. The alkyl group may be linear or branched. If the carbon number of the alkyl group is greater than 3, resistance increases, which is not appropriate.

In Chemical Formula 1 and Chemical Formula 2, the $R_b$ may be hydrogen.

The halogen may be F, Cl, Br, or I, and according to an embodiment, it may be F.

The substituted alkyl group may be an alkyl group in which at least one hydrogen is substituted with an alkyl group, a halogen, an aromatic group, an amine group, an amide, or a nitrile group. The substituted alkyl group means a linear, branched, or cyclic alkyl group, wherein the carbon number is 1 to 3. The aromatic group means an aromatic group having the carbon number of 4 to 6. Examples of the aromatic group may be benzene, pyran, hydropyran, furan, or hydrofuran. The halogen means F, Cl, Br, or I.

As in Chemical Formula 1 and Chemical Formula 2, five-membered ring including one oxygen may effectively obtain effects of improving storage characteristics at a high temperature. On the other hand, if the five-membered ring includes two oxygens, particularly if it is included as —O—C(O)—O— (e.g., Chemical Formula a), the compound may be decomposed during charge and discharge of a battery to form carbonate excessively, and accordingly, $CO_2$ is excessively formed and storage characteristics at a high temperature may be deteriorated, that is, the battery may excessively be swollen.

[Chemical Formula a]

In addition, the five-membered ring including a double bond as in Chemical Formula 1 or 2 may effectively provide an effect of improving storage characteristics at a high temperature. When the five-membered ring includes no double bond, the bond between the five-membered ring and O may be easily broken, which causes to generate methyl sulfonate and to excessively generate gas and resultantly, storage characteristics at a high temperature is sharply deteriorated, that is, the battery may excessively be swollen.

A weight of the additive may be 0.1 wt % to 1 wt % based on a total weight of the electrolyte, or it may be 0.25 wt % to 1 wt % based on a total weight of the electrolyte. When the amount of the additive is within the ranges, storage characteristics at a high temperature may be improved.

The non-aqueous organic solvent serves as a medium for transporting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, propylpropionate, γ-butyrolactone, decanolide, valerolactone, mevalonolactone, caprolactone, and the like.

The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like.

The alcohol-based solvent may include ethanol, isopropyl alcohol, and the like and the aprotic solvent may include nitriles such as T-CN (wherein T is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture. When the organic solvent is used in a mixture, the mixture ratio may be controlled in accordance with a desirable battery performance, which may be widely understood by those skilled in the art.

The carbonate-based solvent is prepared by mixing a cyclic carbonate and a linear carbonate. When the cyclic carbonate and linear carbonate are mixed together in a volume ratio of 1:1 to 1:9, a performance of an electrolyte may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

In Chemical Formula 3, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte of a lithium secondary battery may further include an ethylene carbonate-based compound represented by Chemical Formula 4.

[Chemical Formula 4]

In Chemical Formula 4, $R_7$ and $R_8$ are independently hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When such an additive for improving cycle-life is further used, the amount may be controlled within an appropriate range.

The lithium salt dissolved in an organic solvent supplies lithium ions in a battery, enables a basic operation of a lithium secondary battery, and improves transportation of the lithium ions between positive and negative electrodes. Examples of the lithium salt include at least one supporting salt selected from $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example, an integer ranging from 1 to 20), LiCl, LiI, and $LiB(C_2O_4)_2$ (lithium bis (oxalato) borate; LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment provides a lithium secondary battery including the electrolyte, a positive electrode, and a negative electrode.

The positive electrode includes a current collector and a positive active material layer disposed on the current collector and including a positive active material.

In the positive active material layer, the positive active material may include a compound (lithiated intercalation compound) capable of intercalating and deintercallating lithium and specifically at least one composite oxide of lithium and a metal of cobalt, manganese, nickel, and a combination thereof may be used. Specific examples thereof may be a compound represented by one of chemical formulae. $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_{b-}Co_cMn_dG_eO_2$ ($0.90 \leq a \leq 1.8$, $0 \leq b \leq 0.9$, $0 \leq c \leq 0.5$, $0 \leq d \leq 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$ $QS_2$ $LiQS_2$ $V_2O_5$ $LiV_2O_5$ $LiZO_2$ $LiNiVO_4Li_{(3-f)}J_2(PO_4)_3$ ($0 \le f \le 2$); $Li_{(3-f)}Fe_2(PO_4)_3$ ($0 \le f \le 2$); $Li_aFePO_4$ ($0.90 \le a \le 1.8$)

In chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compound may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed by a method having no adverse influence on properties of a positive active material by using these elements in the compound and for example, the method may include any coating method (e.g., spray coating, dipping, etc.), but is not illustrated in more detail since it is well-known to those skilled in the related field.

In the positive electrode, the positive active material may be included in an amount of 90 wt % to 98 wt % based on a total weight of the positive active material layer.

In an embodiment, the positive active material layer may further include a binder and a conductive material. Herein, the binder and the conductive material may be included in an amount of 1 wt % to 5 wt %, respectively based on the total amount of the positive active material layer.

The binder improves binding properties of positive active material particles with one another and with a current collector and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material is included to provide electrode conductivity and any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may be an aluminum foil, a nickel foil, or a combination thereof, but is not limited thereto.

The negative electrode includes a current collector and a negative active material layer disposed on the current collector and including a negative active material.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include a carbon material, that is, a generally-used carbon-based negative active material in a lithium secondary battery. Examples of the carbon-based negative active material may include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), a Si-carbon composite, Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), a Sn-carbon composite, and the like and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide includes a lithium titanium oxide.

The negative active material layer includes a negative active material and a binder, and optionally a conductive material.

In the negative active material layer, the negative active material may be included in an amount of 95 wt % to 99 wt % based on a total weight of the negative active material layer. In the negative active material layer, a content of the binder may be 1 wt % to 5 wt % based on a total weight of the negative active material layer. When the negative active material layer includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity and any electrically conductive material may be used as a conductive material unless it causes a chemical change. Examples of the conductive material include a carbon-based material such as natural graphite, artificial graphite, carbon black, acetylene black, ketjen black, denka black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive active material layer and the negative active material layer are formed by mixing an active material, a binder and optionally a conductive material in a solvent to prepare an active material composition, and coating the active material composition on a current collector. The formation method of the active material layer is well known in this art, and thus is not described in detail in the detailed description of the present specification. The solvent includes N-methylpyrrolidone and the like, but is not limited thereto. When a water-soluble binder is used in the negative active material layer, a solvent used for preparing the negative active material composition may be water.

In addition, a separator may be disposed between the positive electrode and the negative electrode depending on a type of the lithium secondary battery. Such a separator may include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

Figure 1:
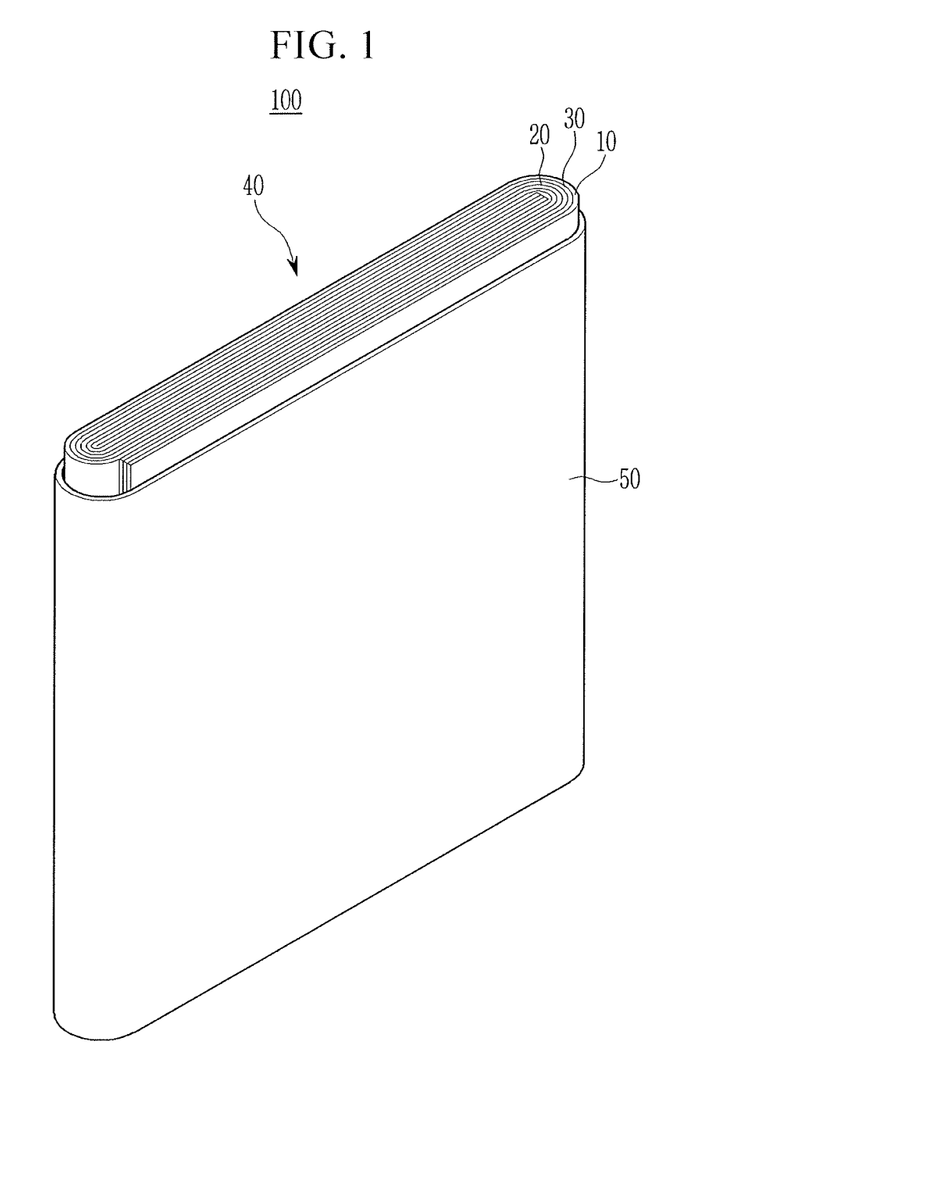
FIG. 1 is a schematic view of a lithium secondary battery according to an embodiment of the present invention.

FIG. 1 is an exploded perspective view of a lithium secondary battery according to an embodiment. The lithium secondary battery according to an embodiment is illustrated as a prismatic battery but is not limited thereto and may include variously-shaped batteries such as a cylindrical battery, a pouch-type battery, and the like.

Referring to FIG. 1, a lithium secondary battery 100 according to an embodiment includes an electrode assembly 40 manufactured by winding a separator 30 disposed between a positive electrode 10 and a negative electrode 20, and a case 50 housing the electrode assembly 40. The positive electrode 10, the negative electrode 20, and the separator 30 may be impregnated with an electrolyte (not shown).

EXAMPLES

Hereinafter, examples of the present invention and comparative examples are described. These examples, however, are not in any sense to be interpreted as limiting the scope of the invention.

(Preparation Example 1) Preparation of Chemical Formula 1a

[Reaction Scheme 1]

In Reaction Scheme 1, Ms is —$SO_2$—$CH_3$.

The following experiments were all conducted under an air atmosphere.

D-isoascorbic acid (50.0 g, 284 mmol) of Chemical Formula b was added to 500 ml of water, then, this solution was cooled down to 0° C., and sodium carbonate ($Na_2CO_3$, 60.2 g, 568 mmol) was slowly added thereto to obtain a yellow solution.

The yellow solution was cooled down to 0° C., and a hydrogen peroxide aqueous solution with a concentration of 30 wt % (a 30% hydrogen peroxide solution in $H_2O$, 64.4 ml, 0.568 mmol) was slowly added thereto in a dropwise fashion for 20 minutes.

[Chemical Formula b]

Subsequently, the obtained mixture was stirred at room temperature (25° C.) for 18 hours. After stirring the mixture for 18 hours, a white solid generated therefrom was filtered and removed, activated carbon (6.3 g) was added thereto to remove remaining non-reacted $H_2O_2$, and the obtained mixture was heated at 70° C. for 3 hours. The heated product was cooled down to room temperature (25° C.), the activated carbon was filtered and removed, and 6 M HCl was slowly added thereto in a dropwise fashion at 0° C., so that a filtrate thereof might have pH of 1.5. The obtained product is treated under a reduced pressure to remove all the solvents, and a solid obtained therefrom was consecutively extracted by using ethyl acetate at 90° C. for 24 hours by using a sequential extractor for liquid to prepare a compound represented by Chemical Formula c (25.2 g, 0.213 mol, yield: 75%).

[Chemical Formula c]

The compound represented by Chemical Formula c was diluted by using anhydrous dichloromethane (400 ml), and triethylamine (Et$_3$N, 70.8 ml, 508 mmol) was added to the obtained solution under a nitrogen atmosphere. The obtained product was cooled down to 0° C., and methanesulfonyl chloride (MsCl, 39.3 ml, 508 mmol) was slowly and dropwisely added thereto under a nitrogen atmosphere.

Six hours later after the addition, the reaction mixture was distilled under a reduced pressure to remove a solvent and then, purified through column chromatography (dispersion medium: hexane:ethyl acetate=1:1 of a volume ratio) by using silica gel to obtain a 2-oxo-2,5-dihydrofuran-3-yl methanesulfonate compound represented by Chemical Formula 1a (14.8 g, 82.8 mmol, yield: 49%).

[Chemical Formula 1a]

$^1$H NMR and $^{13}$C NMR measurement results with respect to the obtained compound represented by Chemical Formula 1a are as follows. In the following experiment result, $^1$H-NMR was measured by using a Varian NMR system (400 MHz, CDCl$_3$, Varian, Inc.), and $^{13}$C NMR was measured by using a Varian NMR system (100 MHz, CDCl$_3$, Varian, Inc.).

$^1$H NMR (400 MHz, CDCl$_3$): 7.30 (t, J=2.0 Hz, 1H), 4.96 (d, J=2.0 Hz, 2H), 3.39 (s, 3H);

$^{13}$C NMR (100 MHz, CDCl$_3$): 166.5, 137.2, 134.2, 67.8, 67.8, 39.7

* Cyclic Voltammetry (CV) Characteristics Evaluation

An additive solution was prepared by adding 1 wt % of 2-oxo-2,5-dihydrofuran-3-yl methanesulfonate of Chemical Formula 1a according to Preparation Example 1 to a mixed solvent of ethylene carbonate, ethylmethyl carbonate, and diethyl carbonate (in a volume ratio of 2:4:4) in which 1.15 M LiPF$_6$ was dissolved.

Figure 2:
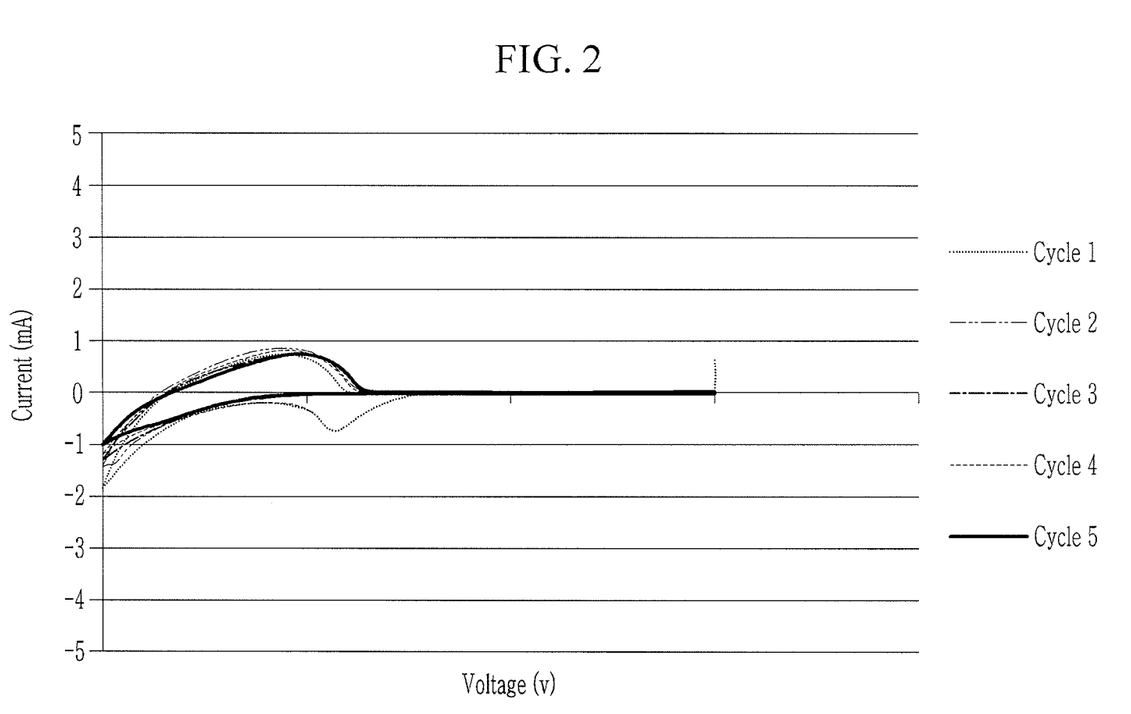
FIG. 2 is a graph showing CV (cyclic voltammetry) results of the additive solution including the additive prepared in Preparation Example 1.

The additive solution, a graphite working electrode, and a lithium (Li) counter electrode were used to measure a cyclic voltammetric voltage (a scan rate: 1 mV/sec) of the 3 electrodes, and the results are shown in FIG. 2.

In FIG. 2, a cycle X indicates X times cycles. As shown in FIG. 2, the additive solution including the additive according to Preparation Example 1 exhibited a decomposition peak, that is, a reduction peak around 1.1 V, and since a reaction is caused at a higher potential than that of ethylene carbonate generally showing a reduction peak at 0.5 V, this result exhibited that the additive solution is reduced faster than the ethylene carbonate.

Example 1

1.15 LiPF$_6$ was added to a mixed solvent of ethylene carbonate, ethylmethyl carbonate, and diethyl carbonate (in a volume ratio of 2:4:4), and 0.25 wt % of the additive represented by Chemical Formula 1a based on 100 wt % of the mixture was added thereto to prepare an electrolyte for a lithium secondary battery.

Example 2

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4) and adding 0.5 wt % of the additive represented by Chemical Formula 1a based on 100 wt % of the mixture thereto.

Example 3

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4) and adding 1.0 wt % of the additive represented by Chemical Formula 1a based on 100 wt % of the mixture thereto.

Example 4

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4) and adding 0.5 wt % of an additive represented by Chemical Formula 2a based on 100 wt % of the obtained mixture thereto.

[Chemical Formula 2a]

Comparative Example 1

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4).

Comparative Example 2

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4) and adding 0.5 wt % of an additive represented by Chemical Formula 10 based on 100 wt % of the obtained mixture thereto.

[Chemical Formula 10]

Comparative Example 3

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4) and adding 0.5 wt % of an additive represented by Chemical Formula 11 based on 100 wt % of the obtained mixture thereto.

[Chemical Formula 11]

Reference Example 1

An electrolyte for a lithium secondary battery was prepared by adding 1.15 LiPF$_6$ to a mixed solvent of ethylene carbonate, ethylmethyl carbonate, and diethyl carbonate (in a volume ratio of 2:4:4) and adding 1.5 wt % of the additive represented by Chemical Formula 1a based on 100 wt % of the obtained mixture thereto.

\* Manufacture of Battery Cell Positive active material slurry was prepared by mixing 96 wt % of a LiCoO$_2$ positive active material, 2 wt % of a ketjen black conductive material, and 2 wt % of polyvinylidene fluoride in an N-methylpyrrolidone solvent. The positive active material slurry was coated on an aluminum foil and then, dried and compressed to manufacture a positive electrode.

Negative active material slurry was prepared by mixing 96 wt % of a graphite negative active material, 2 wt % of a ketjen black conductive material, and 2 wt % of polyvinylidene fluoride in an N-methylpyrrolidone solvent. The negative active material slurry was coated on a copper foil and then, dried and compressed to manufacture a negative electrode.

The positive electrode, the negative electrode, and each electrolyte according to Example 1 to 3, Comparative Example 1 to 3, and Reference Example 1 were used to respectively manufacture lithium secondary battery cells in a common method. Herein, the electrolyte was injected in an amount of 5.8 g.

\* Thickness Increase Rate

The lithium secondary battery cells using the electrolytes according to Examples 1 and 2 and Comparative Examples 1 to 3 were charged up to 4.4 V at 0.7 C up to 100% of SOC (state of charge) (a full charge state that a battery cell was charged to have 100% of charge capacity based on 100% of entire charge capacity of the battery cell during the charge and discharge in a range of 2.75 V to 4.4 V) and then, stored at 60° C. for 28 days. Each battery thickness before and after the storage was measured, and the results are shown in Table 1. In addition, the results are used to calculate a battery thickness increase rate, and the battery thickness increase rate results are shown in Table 1.

TABLE 1

| | Content of additive (wt %) | 60° C. storage test | | |
|---|---|---|---|---|
| | | Thickness (mm) | | Thickness increase rate (%) |
| | | Initial | After 28 days | |
| Comparative Example 1 | 0 | 4.90 | 5.43 | 10.8 |
| Example 1 | 0.25 | 4.92 | 5.10 | 3.7 |
| Comparative Example 2 | 0.5 | 4.90 | 5.45 | 11.3 |
| Comparative Example 3 | 0.5 | 4.89 | 5.31 | 8.6 |
| Example 2 | 0.5 | 4.91 | 5.03 | 2.4 |

As shown in Table 1, Example 1 exhibited a thickness increase rate of 3.7%, but that of Comparative Example 1 was 10.8 wt % which is greatly higher. Referring to this result, Example 1 using the electrolyte including the additive of Chemical Formula 1a exhibited very improved storage characteristics at a high temperature compared with Comparative Example 1 using an electrolyte including no additive.

In addition, Example 2 using the electrolyte including the additive of Chemical Formula 1 exhibited improved storage characteristics at a high temperature compared with Comparative Examples 2 and 3 using each electrolyte respectively including the additive of Chemical Formula 10 including two oxygens and the additive of Chemical Formula 11 having no double bond in a five-membered ring.

In addition, the lithium secondary battery cell using the electrolyte of Example 4 was charged up to 4.4 V at 0.7 C with 100% of SOC (state of charge) (a full charge, a state of being charged to have charge capacity of 100% based on 100% of the entire charge capacity of the battery cell during the charge and discharge within a range of 2.75 V to 4.4 V) and then, stored at 60° C. for 28 days. Before the storage, a battery thickness was measured, after the storage, the battery thickness was measured again, and the results are shown in Table 2. In addition, these results were used to calculate a battery thickness increase rate, and the obtained result is shown in Table 2. In addition, for reference, the result of the lithium secondary battery cell using the electrolyte of Comparative Example 1 was also shown in Table 2.

TABLE 2

| | Content of additive (wt %) | 60° C. storage test | | |
|---|---|---|---|---|
| | | Thickness (mm) | | Thickness increase rate (%) |
| | | Initial | After 28 days | |
| Comparative Example 1 | 0 | 4.90 | 5.43 | 10.8 |
| Example 4 | 0.5 | 4.91 | 5.24 | 6.7 |

As shown in Table 2, a thickness increase rate of Example 4 was 6.7%, but that of Comparative Example 1 was 10.8 wt % which is greatly higher. This result shows that Example 4 using the electrolyte including an additive of Chemical Formula 2a exhibited very improved storage characteristics at a high temperature compared with Comparative Example 1 using an electrolyte including no additive.

\* Impedance (Electrochemical Impedance Spectroscopy: EIS) Measurement

Figure 3:
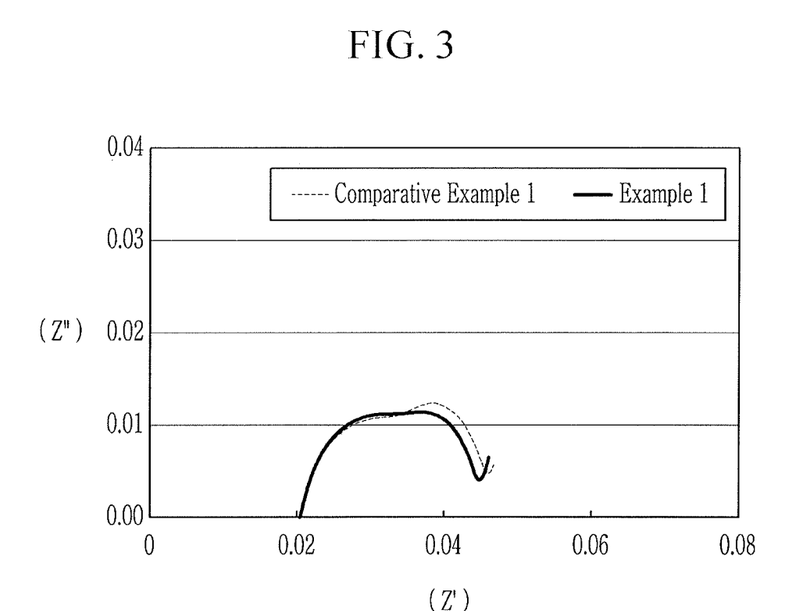
FIG. 3 is a graph showing EIS measurement before storing lithium secondary battery cells manufactured using the electrolytes of Example 1 and Comparative Example 1 at a high temperature.
Figure 4:
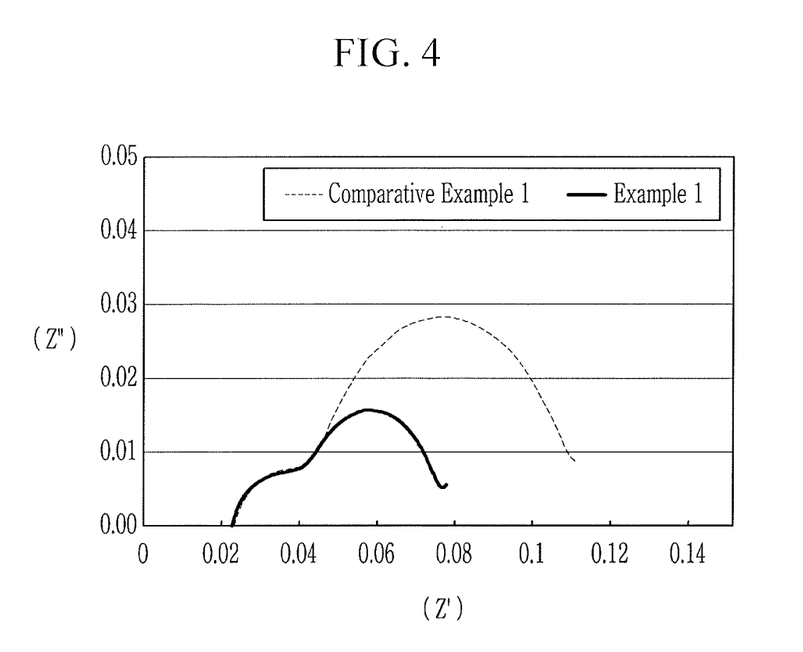
FIG. 4 is a graph showing EIS measurement after storing lithium secondary battery cells manufactured using the electrolytes of Example 1 and Comparative Example 1 at a high temperature.

The lithium secondary battery cells respectively using the electrolytes of Example 1 and Comparative Example 1 were charged up to 4.4 V at 0.7 C with 100% of SOC (state of charge) (a full charge, a state of being charged to have 100% of charge capacity based on 100% of the entire charge capacity of the battery cell within a range of 2.75 V to 4.4 V during the charge and discharge) and then, stored at 60° C. for 28 days, and then, impedance thereof before and after the storage was measured, and the results are respectively shown in FIGS. 3 and 4.

As shown in FIG. 3, before the storage at a high temperature, Example 1 and Comparative Example 1 exhibited almost no impedance difference, that is, almost no charge transfer resistance difference, but as shown in FIG. 4, after the storage at a high temperature, Example 1 exhibited greatly lower impedance than that of Comparative Example 1.

\* High Temperature Cycle-Life Characteristics Evaluation

The lithium secondary battery cells respectively using the electrolytes of Examples 2 and 3 and Reference Example 1 were charged at 45° C., 1 C and 4.4 V cut-off voltage and discharged at 1 C and 3 V cut-off voltage discharge, which were 100 times performed. Capacity retention (%) was obtained by calculating a ratio of $100^{th}$ discharge capacity based on $1^{st}$ discharge capacity, and the results are shown in Table 3 and FIG. 5.

TABLE 3

|  | Capacity retention (%) |
| --- | --- |
| Example 2 | 87.0 |
| Example 3 | 86.6 |
| Reference Example 1 | 84.3 |

Figure 5:
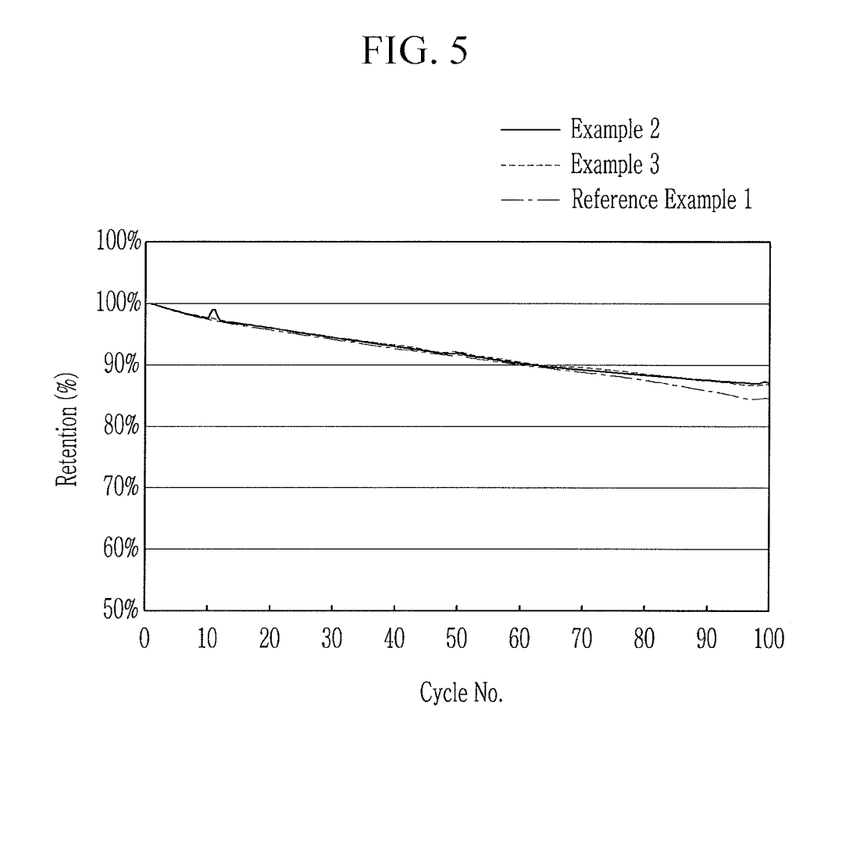
FIG. 5 is a graph showing high temperature cycle-life characteristics of the lithium secondary battery cells manufactured using the electrolytes of Examples 2 and 3 and Reference Example 1.

As shown in Table 3 and FIG. 5, lithium secondary battery cells using each electrolyte respectively including 0.5 wt % and 1 wt % of the additive represented by Chemical Formula 1a according to Examples 2 and 3 exhibited excellent capacity retention at a high temperature and thus excellent high temperature cycle-life characteristics compared with the lithium secondary battery cell using the electrolyte using 1.5 wt % of the additive represented by Chemical Formula 1a according to Reference Example 1.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. An electrolyte for a lithium secondary battery, comprising
a non-aqueous organic solvent;
a lithium salt; and
an additive represented by Chemical Formula 1 or Chemical Formula 2:

[Chemical Formula 1]

wherein, in Chemical Formula 1,
$R_a$ is a halogen, a substituted or unsubstituted alkyl group, or $C_nF_{2n+1}$ (n is an integer of 1 to 3),
$R_b$ is hydrogen, a halogen, a substituted or unsubstituted alkyl group, or $C_nF_{2n+1}$ (n is an integer of 1 to 3), and
X is S, O, or C,

[Chemical Formula 2]

wherein, in Chemical Formula 2,
$R_c$ is a halogen, a substituted or unsubstituted alkyl group, or $C_nF_{2n+1}$ (n is an integer of 1 to 3),
$R_d$ is a halogen, a substituted or unsubstituted alkyl group, or $C_nF_{2n+1}$ (n is an integer of 1 to 3), and
X is S, O, or C.

2. The electrolyte for a lithium secondary battery of claim 1, wherein a content of the additive is 0.1 wt % to 1 wt % based on a total weight of the electrolyte.

3. The electrolyte for a lithium secondary battery of claim 1, wherein a content of the additive is 0.25 wt % to 1 wt % based on a total weight of the electrolyte.

4. The electrolyte for a lithium secondary battery of claim 1, wherein the additive is the compound of Chemical Formula 1.

5. The electrolyte for a lithium secondary battery of claim 1, wherein the $R_a$ and $R_c$ are each independently a substituted or unsubstituted alkyl group.

6. The electrolyte for a lithium secondary battery of claim 1, wherein the $R_b$ is hydrogen.

7. The electrolyte for a lithium secondary battery of claim 1, wherein the alkyl group has a carbon number of 1 to 3.

8. A lithium secondary battery comprising
a negative electrode including a negative active material;
a positive electrode including a positive active material; and
the electrolyte of claim 1.

\* \* \* \* \*